US006369529B1

(12) United States Patent
McClintock et al.

(10) Patent No.: US 6,369,529 B1
(45) Date of Patent: Apr. 9, 2002

(54) REMOTE POWER SEAT CONTROL SYSTEM AND METHOD

(75) Inventors: Brian McClintock, Farmington Hills; David W. Gaines, Farmington, both of MI (US)

(73) Assignee: Tachi-S Engineering, U.S.A. Inc., Farmington Hills, MI (US)

( * ) Notice: Subject to any disclaimer, the term of this patent is extended or adjusted under 35 U.S.C. 154(b) by 0 days.

(21) Appl. No.: 09/585,024

(22) Filed: Jun. 1, 2000

(51) Int. Cl.[7] ............................ H04Q 7/00; H04Q 9/00

(52) U.S. Cl. ................ 318/16; 340/825.29; 340/825.72

(58) Field of Search ........................... 340/825, 825.28, 340/825.29, 825.71, 825.72; 318/266, 267, 286, 16; 359/115

(56) References Cited

U.S. PATENT DOCUMENTS 4,997,053 A 3/1991 Drori et al.
5,038,086 A * 8/1991 Ahmed et al. .............. 318/286
5,040,168 A * 8/1991 Maue et al. ................ 359/115
5,254,924 A 10/1993 Ogasawara
5,285,139 A 2/1994 Ogasawara
5,552,789 A 9/1996 Schuermann
5,571,253 A 11/1996 Blackburn et al.
5,600,214 A * 2/1997 Fromson ...................... 318/16
5,812,399 A * 9/1998 Judic et al. ................. 318/266

* cited by examiner

*Primary Examiner*—Marlon T. Fletcher
(74) *Attorney, Agent, or Firm*—Dykema Gossett PLLC

(57) ABSTRACT

A power seating system includes a selector, a transmitter, a receiver, a controller and a seat function circuit. The selector has a plurality of user-actuated switches configured to generate one or more command signals for adjusting a position of a vehicle seat throughout its range of motion. The selector is disposed in a passenger compartment of the vehicle away from a seat assembly having the receiver, controller, and seat function circuit. The transmitter has an input for receiving the command signals and an output for transmitting electromagnetic radiation signals corresponding to the command signals. The receiver receives the generated electromagnetic radiation signals and reproduces the command signals. The controller generates control signals according to the reproduced command signals. The seat function circuit includes an adjusting circuit arranged to adjust the position of the seat according to the control signals. Wireless remote control eliminates the need for a wiring harness connecting the selector with the seat assembly.

4 Claims, 5 Drawing Sheets

REMOTE POWER SEAT CONTROL SYSTEM AND METHOD

BACKGROUND OF THE INVENTION

I. Technical Field

The present invention relates to power operated vehicle seats, and more particularly, to a remote power seat control system and method.

II. Discussion of the Related Art

A power seating system for an automotive vehicle has a seat assembly that is generally equipped with a variety of seating posture adjustment devices working under motor control. Such a seat assembly may be moved forward or backward, up or down, the incline or tilt of the seat assembly may be adjusted, and the position of the headrest may be adjusted as well. In addition, consumer demand has resulted in further enhancements to the power seating system such as, for example, a lumbar support adjustment, as well as a seat heater. User-actuated switches for controlling the foregoing features (as well as others) have conventionally been located on a lower portion of the seat assembly where the user will have relatively easy access to the switches. However, for a variety of reasons, including user-convenience, such user-actuated switches have also been located in the passenger compartment of the vehicle away from the seat assembly. For example, these locations may include an interior vehicle door panel, an instrument panel, and a center console. The remotely located user-actuated switches are typically connected to the power seat assembly by a wiring harness.

Several problems arise from the use of wiring harnesses in systems having remotely-located switch configurations. One problem involves the large amount of labor required for installation, which may involve routing the harness through complex door, instrument panel and console structures. In addition, servicing the wiring harness after installation is difficult due to its location. Further, the wiring harness can develop short circuits and/or open circuits after installation, which may impair the operability of the power seating system functions. Moreover, the wiring harness may rattle during vehicle operation, which is undesirable from the user's point of view. Finally, wiring harnesses conventionally are relatively heavy (i.e., increase the weight of the vehicle), bulky, and expensive. As more and more features are added to power seating systems, the complexity and size of the wiring harnesses used also increases, thereby exacerbating the above-identified problems.

As further background, it is known to provide, generally, a wireless remote control for a power seating system; however, the remote control in such a system only provides the capability to command the seat to move to a predetermined position (i.e., there is no remote adjustment of the seat position, only a recall command to a predetermined position). Such a remote control system is thus of limited or of no value in adjusting the features associated with common power seating systems.

Accordingly, there is a need to provide a multi-function power seating system that minimizes or eliminates one or more of the problems as set forth above.

SUMMARY OF THE INVENTION

It is an object of the present invention to minimize or eliminate the problems and disadvantages associated with conventional power seating systems that have function controls that are not mounted on the seat itself.

In order to achieve this and other objects, according to the present invention, a power seating system is provided that includes four (4) major parts: a selector means, a control means, a seat function means, and means for communicating command signals from the selector means to the control means by way of electromagnetic radiation. The selector means includes a plurality of user-actuated switches for generating one or more command signals. The command signals are configured to adjust the position of a vehicle seat assembly throughout its range of motion. The control means is responsive to the command signals for generating one or more control signals. The seat function means is provided for controlling the functions or features associated with the seat assembly and includes means for adjusting the position of the seat assembly in accordance with the control signals. Significantly, by communicating the command signals from the selector means to the control means by way of electromagnetic radiation (i.e., in a wireless fashion), the wiring harness required by conventional systems may be eliminated. Eliminating the wiring harness in turn minimizes and/or eliminates the extensive labor and expense generally needed to manufacture, install and service the wiring harness.

In a preferred embodiment, the means for communicating the command signals includes radio-frequency (RF) transmission means for generating RF signals corresponding to the command signals. The communicating means in this embodiment further includes RF reception means responsive to the generated RF signals for reproducing the command signals. The reproduced command signals may then be suitably processed by the control means.

In an alternate embodiment, the communicating means includes light emitting means for generating light signals corresponding to the command signals. The communicating means in this embodiment further includes light reception means responsive to the generated light signals for reproducing the command signals, which may then be processed by the control means as described above.

BRIEF DESCRIPTION OF THE DRAWINGS

Other features, advantages, and uses of the present invention will be readily appreciated by one of ordinary skill in the art by reference to the following detailed description when considered in connection with the accompanying drawings, a brief description of which is set forth immediately below.

DETAIL DESCRIPTION OF THE PREFERRED EMBODIMENTS

Figure 1:
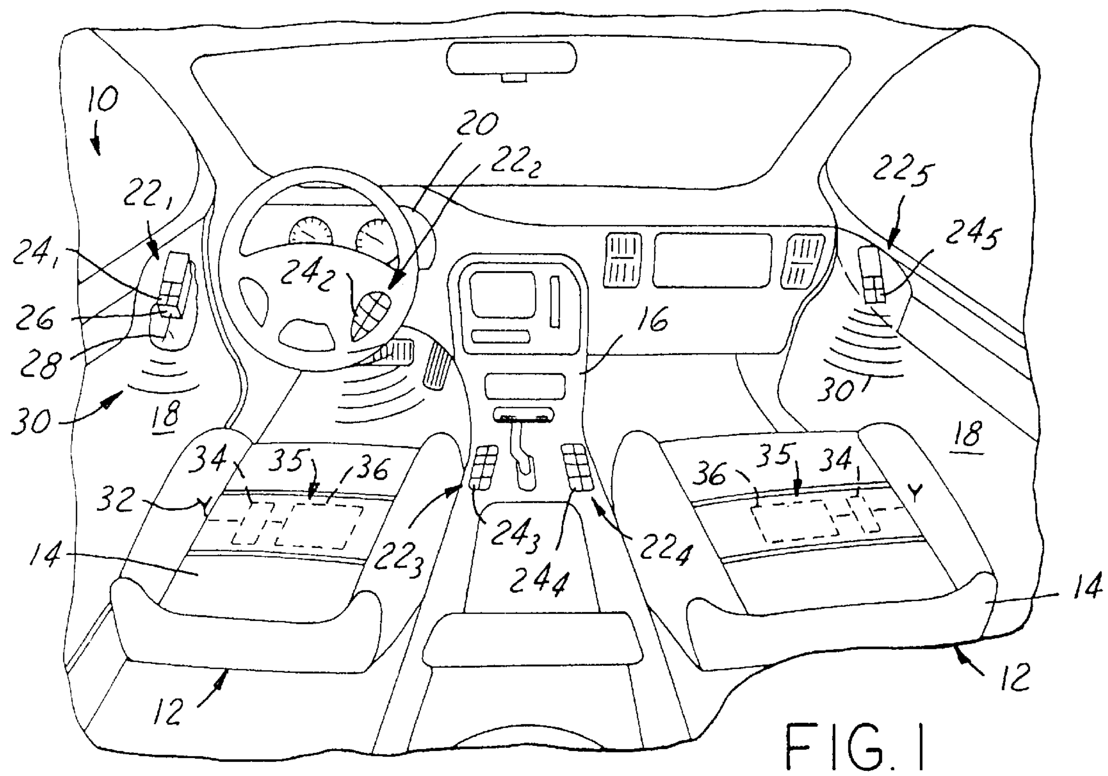
FIG. 1 is a fragmentary schematic view of a vehicle including a preferred power seating system embodiment according to the present invention, particularly including radio frequency (RF) communicating means.

Referring now to the drawings wherein like reference numerals are used to identify identical components in the various views, FIG. 1 shows a first preferred embodiment of a power seating system 10 according to the present invention. An automotive vehicle adapted for land transportation is the preferred environment in which embodiments according to the present invention may be used. It should be understood, however, that the invention is not so limited and extends to uses of the invention in other environments.

Before proceeding to a detailed description of the preferred embodiments, a general overview of the problems solved by the present invention will be set forth. The power seating system 10, as shown in FIG. 1 in the context of a passenger vehicle, includes a seat assembly 12 comprising a seat 14. As described in the Background, function or feature selector switches are conventionally mounted to seat 14 (particularly on a lower portion thereof) where they may be conveniently actuated by the user. However, prior systems also mount such selector switches in other locations in the cabin, such as on a center console 16, an interior door panel 18, and/or an instrument panel 20. Conventional power seating systems that mount the selector switches away from the seat assembly typically require the use of a wiring harness. The advance occasioned by the present invention provides for wireless communication from the selector switches to the seat assembly (which includes the driver motors and the like for adjusting the seat position). The first preferred embodiment to be described for wireless communication involves the use of radio frequency (RF) signals, while the second preferred embodiment involves the use of light signals, such as infrared (IR) light. By eliminating the need for a wiring harness, installation labor is greatly reduced, serviceability is enhanced, and weight, bulkiness and expense are all reduced. Operational problems (e.g., short circuits/open circuits) are also minimized.

Figure 3:
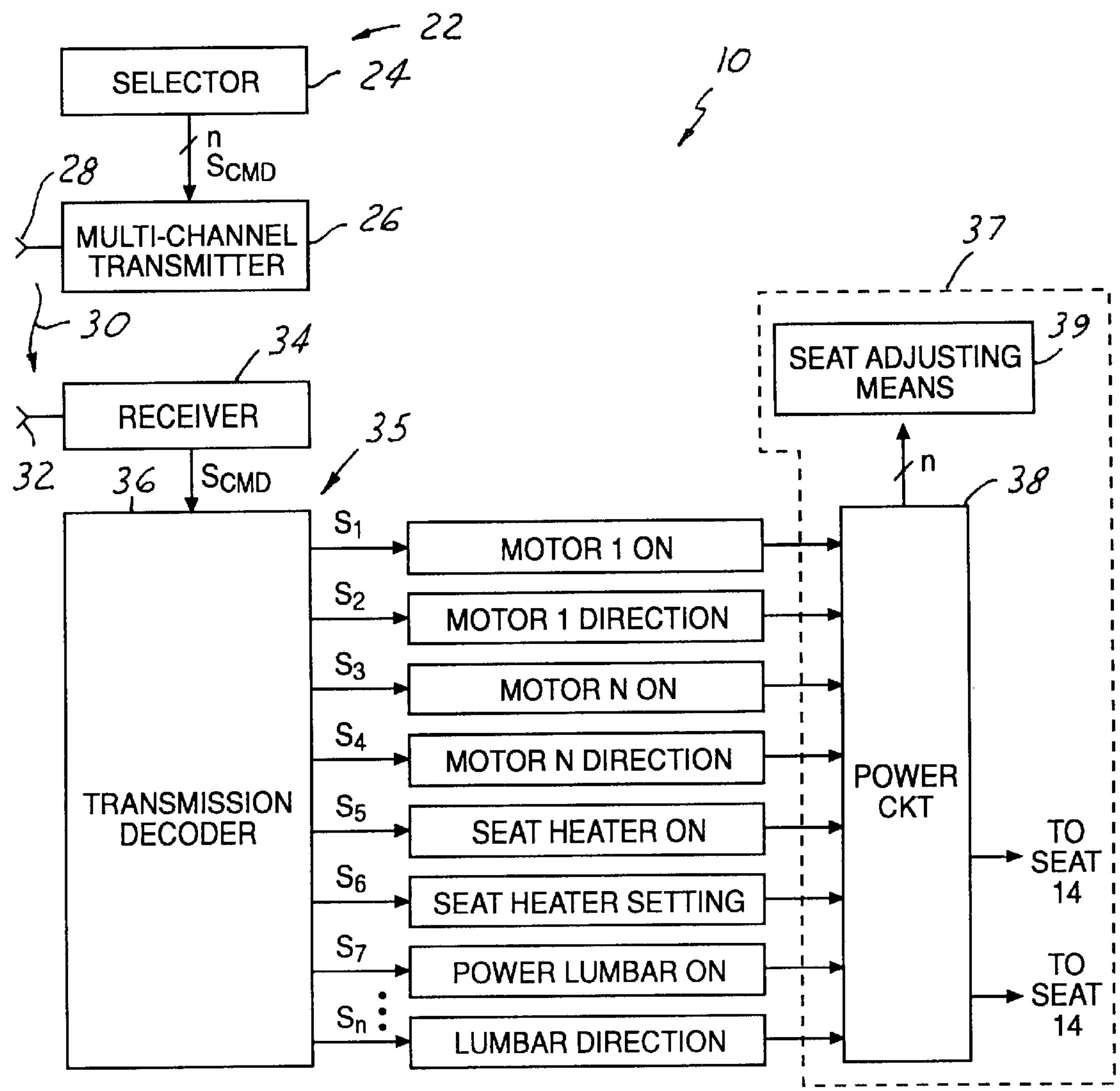
FIG. 3 is a simplified schematic and block diagram view showing functional elements of, the preferred embodiment illustrated in FIG. 1.
Figure 4:
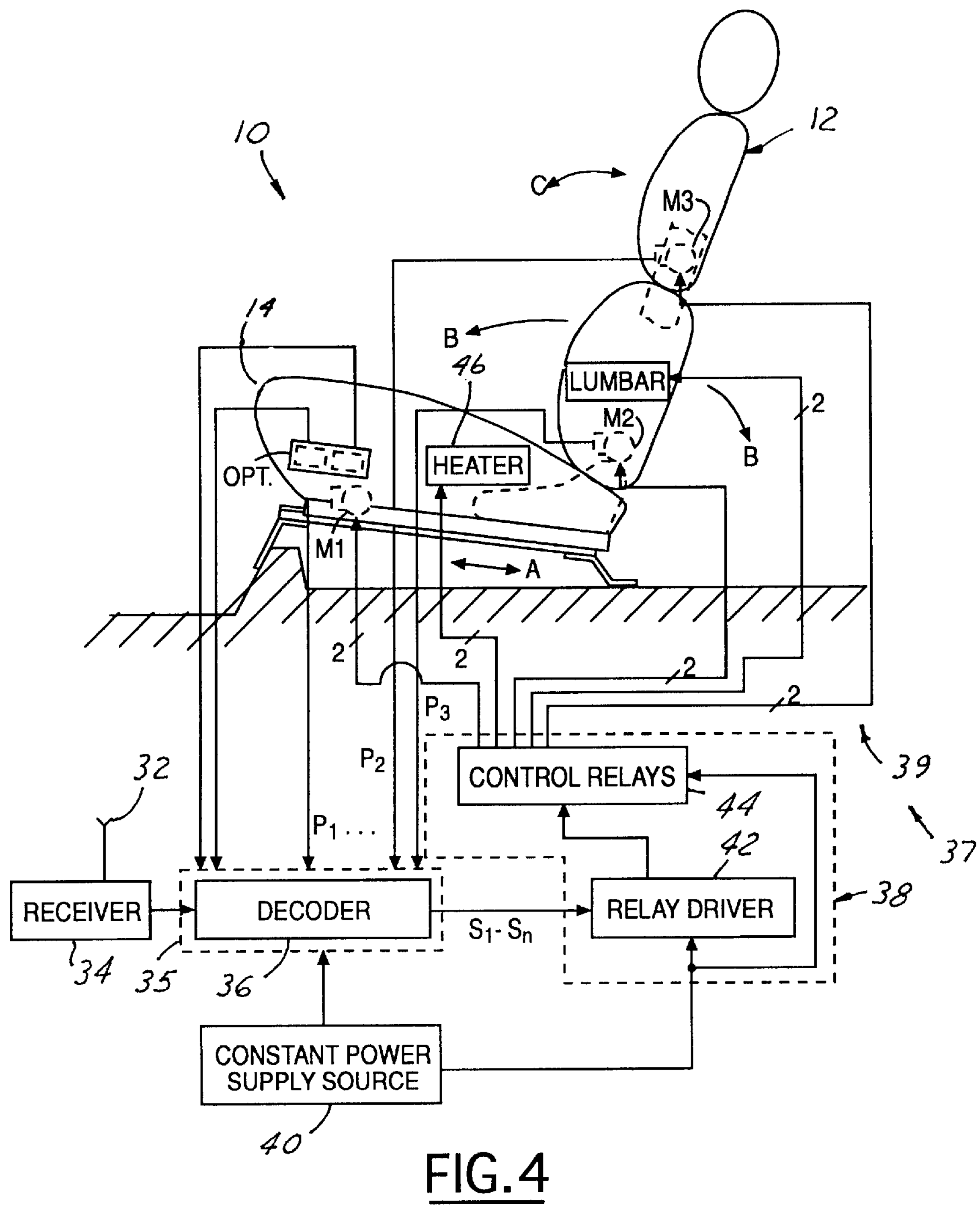
FIG. 4 is a partial schematic and block diagram view of a vehicle power seating system illustrating in greater detail the power circuit of FIG. 3.

Referring to FIGS. 1 and 4, power seating system 10 also includes (in addition to seat assembly 12/seat 14) one or more seat function or feature selector assemblies, designated in the drawings as $\mathbf{22}_1, \mathbf{22}_2, \ldots, \mathbf{22}_5$. Each assembly $\mathbf{22}_i$ includes a corresponding selector its $\mathbf{24}_1, \mathbf{24}_2, \mathbf{24}_3 \ldots, \mathbf{24}_5$. In the first preferred embodiment (FIG. 1), each selector assembly $\mathbf{22}_i$ includes a radio-frequency (RF) transmission means or circuit, such as an RF transmitter 26 (best shown in FIG. 3), for generating and transmitting by way of an antenna 28 (best shown in FIG. 3) RF signals 30. Seating system 10 further includes a receiving antenna 32, an RF reception means or circuit, such as an RF receiver 34, a control means or circuit 35 comprising a transmission decoder 36, and a seat function means or circuit 37 (best shown in FIG. 4) for controlling predetermined functions or features (e.g., seat position) associated with seat 14.

FIG. 3 shows seating system 10 in greater detail. Selector 24 includes a plurality of user-actuated switches for generating one or more command signals, designated $S_{CMD}$. The command signals are configured to adjust the position of vehicle seat 14 throughout its range of motion. For example, one of the user-actuated switches may be a 3-position rocker-type switch provided for forward/backward operation of seat 14. As a further example, a dial-type switch may be provided to enable the user to "dial-in" a desired heat setting (which may subsequently be converted to a 4-bit or 8-bit digital word). Selector 24 may comprise these and other conventional switch structures well-known to those of ordinary skill in the art.

Transmitter 26 may comprise a multi-channel RF transmitter, and is provided for generating RF signals 30 corresponding to command signals $S_{CMD}$. Transmitter 26 may include circuitry for performing an encoding function that is integral therewith. Specifically, the encoding function operates by receiving switch inputs from selector 24 (i.e., the command signals) and outputting a suitable digital word for transmission. Preferably, one channel of the plurality of available channels associated with transmitter 26 is allocated per user-actuated switch. This allocation permits more than one switch to be activated at a time. In the alternative, however, a single channel transmitter may be used to transmit composite, serialized data corresponding to the status or state of the various user-actuated switches. Preferably, the RF signal 30 produced and irradiated by way of antenna 28 is a relatively low power signal (i.e., of a power sufficient to extend through a usable range of between about 1 to 2 feet). Transmitter 26 may comprise well-known and conventional circuitry. For example, U.S. Pat. No. 4,997,053 entitled "Remote Control Vehicle Seat and Steering Wheel Positioning System", issued Mar. 5, 1991, discloses a suitable multi-channel transmitter, and is hereby incorporated completely by reference.

RF signals 30 propagate from transmitting antenna 28 to receiving antenna 32. RF signals may comprise electromagnetic radiation falling within the radio frequency spectrum, preferably those frequencies designated for amplitude modulation (AM) broadcasting or frequency modulation (FM) broadcasting. More generally, however, RF signals 30 may comprise electromagnetic waves falling anywhere within the radio frequency spectrum (i.e., radio frequency spectrum includes frequencies between about 3 kilohertz and 300 gigahertz, as defined by the U.S. Department of Commerce, National Telecommunications and Information Administration, Office of Spectrum Management, November 1996).

Receiving antenna 32 is, in the preferred embodiment, mounted in seat 14. Receiving antenna 32 is configured to receive RF signals 30 in a manner well-known to those of ordinary skill in the art. The actual configuration of antenna, such as its length, may vary depending on the frequency range selected for transmission.

Receiver 34 may comprise a multi-channel RF receiver. Receiver 34 is responsive to the generated RF signals 30 received by antenna 32 for reproducing the command signals $S_{CMD}$. Receiver 34 is preferably designed to be complementary with the electrical characteristics of transmitter 26, in a manner well-known. Receiver 34 may comprise conventional and well-known structures (for example, as described and illustrated in U.S. Pat. No. 4,997,053 referred to above).

The combination of transmitter 26, antenna 28, antenna 32, and receiver 34 thus define the means for communicating the command signals $S_{CMD}$ by way of electromagnetic radiation from selector 24 to control means 35. This "wireless" mode of transmission eliminates the need for a wiring harness, as described above.

With continued reference to FIG. 3, control means 35 is responsive to the reproduced command signals $S_{CMD}$ for generating one or more control signals, designated $S_1, S_2, \ldots, S_n$. Control means 35 may include a multi-channel signal processor, particularly a multi-channel transmission decoder 36 when a multi-channel transmitter 26 and receiver 34 are used. Decoder 36 may comprise dedicated hardware components configured to decode the input command signals in a manner complementary to the encoding function described above. The decoder 36 may, however, be implemented using a conventional processor (i.e., microprocessor, microcontroller, etc.) executing in accord with a stored program ("software"). In either implementation, the control signals $S_1, \ldots, S_n$, are configured to turn various motors on/off, control motor direction, activate a seat heater (on/off) and adjust its heat setting, and activate a power lumbar feature, as well as controlling the lumbar direction. Of course, the foregoing is exemplary only and not limiting in nature.

Seat function means 37 is provided for controlling predetermined functions or features associated with seat assembly 12. Seat function means 37 includes a power circuit 38, and a means or circuit 39 for adjusting the position of seat 14 in accordance with one or more of the control signals $S_1$, $S_2, \ldots, S_n$. Seat function means 37 further includes means or structure for controlling seat features other than those related to position, such as a seat heater feature and/or a power lumbar support feature. Power circuit 38 is configured generally to convert/translate logic-level electrical control signals $S_1, \ldots, S_n$ to power-level (i.e., relatively high current) drive signals. The power level drive signals are adapted to appropriately control seat adjusting means 39, and other power consuming structures such as the seat heater, the seat power lumbar support, and the like.

FIG. 4 generally shows vehicle seat assembly 12 in schematic form. In the illustrated embodiment, antenna 32, receiver 34, control means 35, decoder 36, and seat function means 37 (including power circuit 38, adjustment means 39, among others) are physically co-located with seat 14. Power circuit 38 controls the connection of an output power rail generated by a constant power supply source 40 to various power devices. Power Circuit 38 establishes this control by producing on its output a plurality of drive signals. Power circuit 38 includes a relay driver circuit 42, and a plurality of control relays 44. Relay driver circuit 42 is configured to receive the plurality of control signals $S_1$–$S_n$ and generate in response thereto signals capable of driving selected ones of the plurality of control relays 44. Relay driver circuit 42, and control relays 44 may comprise conventional and well-known circuits and components.

The seat assembly 12 also has physically collocated therewith various motors, positioning structures and the like. In particular, seat assembly 12 includes motors M1, M2, and M3, which may comprise DC geared motors adapted to cause actuation of a seat slide device, a reclining device, and a seat back bending device, respectively. The seat slide device is actuated by control of motor M1 to permit adjustment in the position of seat 14 in the forward and backward direction indicated by the double arrowed line designated "A" in FIG. 4. The reclining device is actuated by control of motor M2 to permit adjustment of the reclining angle of a seat back, in the direction indicated by the arrows designated "B". The seat back bending device is actuated by control of motor M3 to permit adjustment of the tilt angle of an upper part of the seat back, in the direction indicated by the double arrowed line designated "C". The foregoing structures are known. In addition, further conventional structures may be included, for example, to raise and lower seat 12 (not shown). The motors M1–M3 are selectively, electrically connected to source 40 by way of a corresponding one of control relays 44. The drive signals produced at the output of control relays 44 are adapted in voltage and current carrying capability, among other parameters, to drive motors M1, M2, and M3. Appropriately controlling the relays, therefore, results in controlled operation of the position of seat 14. Thus, motors M1–M3, along with the above-described seat slide, reclining, and seat back bending structures referred to above, and equivalents thereof, form the means 39 for adjusting the position of the seat 14 in accordance with control signals $S_1$–$S_n$.

Motors M1–M3 may include, optionally, a respective position sensor for generating position indicative signals $P_1$, $P_2$, and $P_3$ representative of the relative position of the motor shaft (or the position of the respective seat positioning structure). The position of the seat 14 may be derived from the position indicative signals $P_1$, $P_2$, and $P_3$. These position signals may be employed by control means 35 for a variety of purposes, such as, for example, seat position memory capability. Seat assembly 12 may optionally include a selector, designated OPT, mounted to a lower portion of seat 14, as in conventional systems.

Seat assembly 12 may further include a seat heater 46 (which may be a resistive element) as well as a power lumbar support mechanism 47. Drive signals from power circuit 38 are configured to activate these features in a manner well-known.

Figure 5:
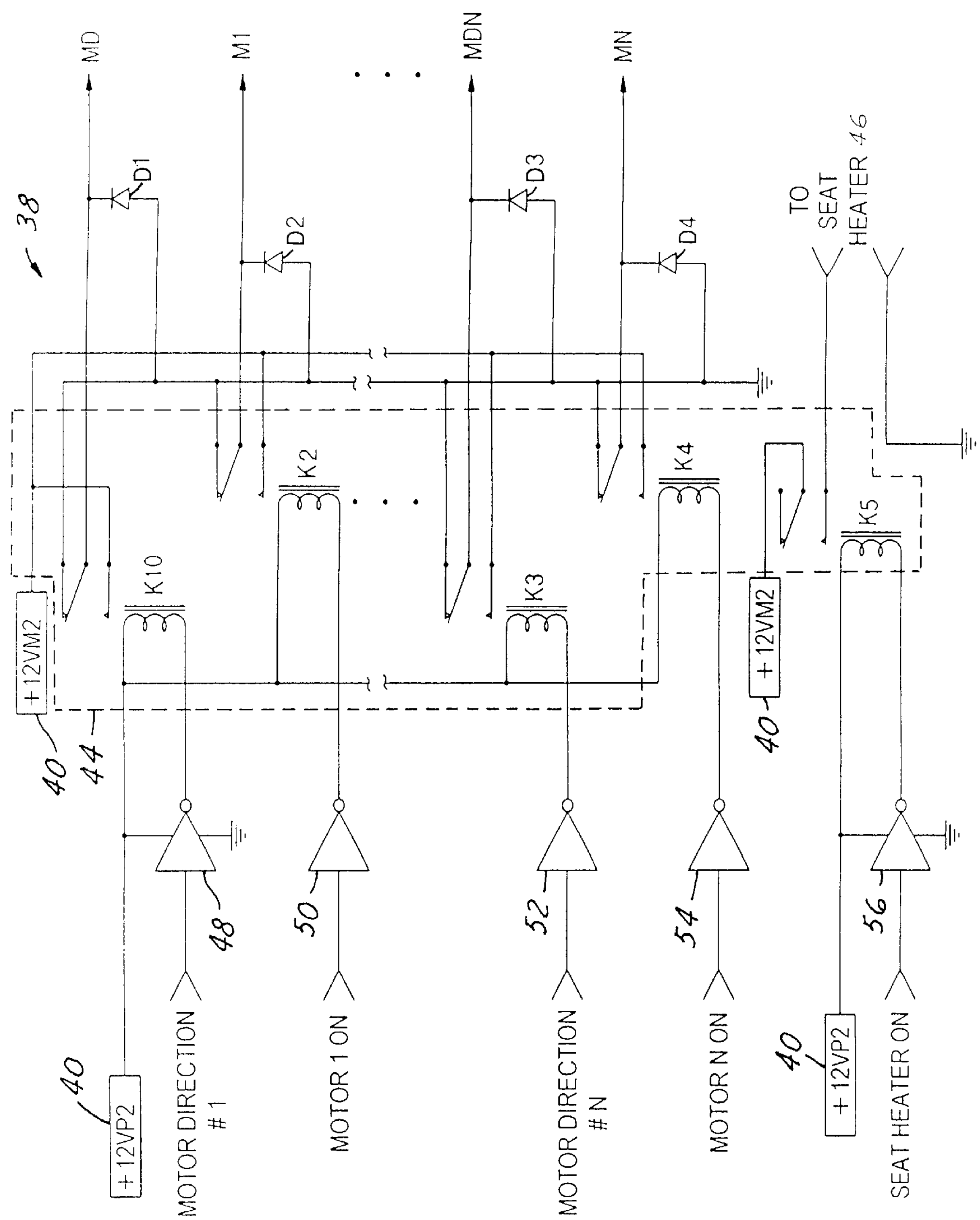
FIG. 5 is a simplified schematic diagram view showing, in greater detail, an exemplary implementation of the power circuit shown in block diagram form in FIG. 3.

FIG. 5 shows power circuit 38 in greater detail. Relay driver circuit 42 includes, in the illustrated embodiment, inverting buffer/amplifiers 48, 50, 52, 54 and 56. Control relays 44 include, in the illustrated embodiment, relays K1, K2, K3, K4 and K5. In addition, circuit 38 may further include clamping diodes D1, D2, D3, and D4. Diodes D1–D4 are provided to ensure that electrical potentials on the respective drive lines to the motors (and other electrical structures) do not transition to a relatively negative voltage, as may occur due to switching electrical currents in and out of inductive loads and the like.

Amplifier 48 is responsive to a "motor direction #1" signal (i.e., control signal designated $S_2$ in FIG. 3) for controlling motor direction drive line MD1 to assume either +12 volts or a ground potential. The polarity of line MD1 in turn controls the direction of Motor #1. Amplifier 50 is responsive to "Motor #1 On" signal (designated as control signal $S_1$ in FIG. 3) for controlling motor drive line M1 to assume either +12 volts (i.e., on) or a ground potential (i.e., off). Amplifiers 52 and 54, in combination with relays K3 and K4, respectively, operate in a similar manner for motor N. Similar circuitry (not shown) may be used for intermediate motors #2 through (n−1), if provided. Amplifier 56 is responsive to a "Seat Heater On" control signal (designated S, in FIG. 3) for applying a power source potential (e.g., +12 volts) across seat heater 46. Power lumber mechanism 47 (best shown in FIG. 4) may be controlled by circuitry similar (but not expressly shown) in FIG. 5.

Figure 6:
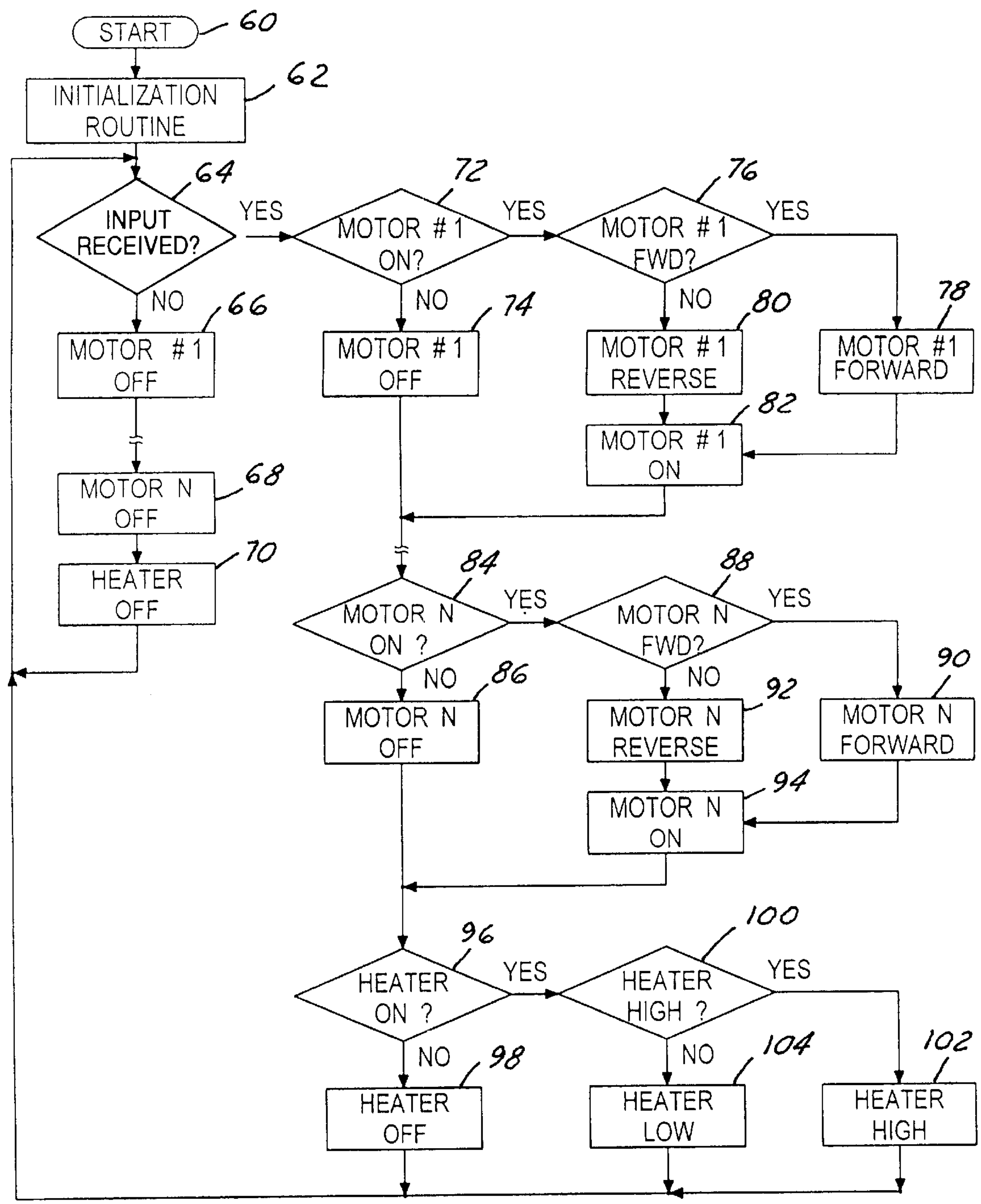
FIG. 6 is a flowchart diagram showing an exemplary method of operating a preferred embodiment according to the present invention.

FIG. 6 shows an exemplary control methodology which may be used for operating power seating system 10. Step 60 indicates the beginning of the routine, which may be a software-based program stored in a non-volatile memory for execution by control means 35.

In step 62, control means 35, in one embodiment, executes an initialization routine. The initialization routine may execute steps for polling inputs and outputs to determine the electrical integrity of power seating system 10, and/or other needed initialization tasks as would be recognized by one of ordinary skill in the art.

In step 64, control means 35 checks to determine whether an input (i.e., a reproduced command signal) has been received from receiver 34. If "NO", then step 66 is executed. In step 66, control means 35 via decoder 36 generates an appropriate control signal to turn motor 1 off. Further control signals are generated in a like fashion to control the other motors so that they are off, until the last motor, designated N, is turned off, as illustrated in step 68. It should be appreciated that the motors may already be "off", so that issuing the "turn off" control signal results simply in maintaining the motors "off".

Control then passes to step 70. In step 70, control means 35 via decoder 36 generates an appropriate control signal to turn off heater 46. In addition, any other devices that may be activated are checked to ensure that they are off. Control of the routine is then returned to decision step 64.

However, when an input command signal has been received in step 64 ("YES"), then control is passed to step 72.

In step 72, control means 35 via decoder 36 determines whether the input command received includes the command to turn motor 1 on. If the answer is "NO", then control of the routine is transferred to step 74, where an appropriate control signal is generated (e.g., by control means 35 by way of decoder 36) to turn or maintain motor 1 off.

However, should the input command contain the command to turn (or keep) motor 1 on ("YES"), then control of the routine is transferred to decision step 76. In decision step 76, control means 35 via decoder 36 determines whether the direction portion of the input command associated with motor 1 indicates a forward direction. If the answer to this inquiry is "YES", control of the routine is transferred to execution step 78, where an appropriate command signal is generated by control means 35 by way of decoder 36 to place motor 1 in a forward operating state. Otherwise, control of the routine is passed to step 80, where an appropriate control signal is generated by decoder 36 so as to place motor 1 in a reverse operating state. In either case, control is then passed to step 82, where an appropriate control signal is generated by decoder 36 to activate motor 1. The methodology set forth above in steps 72–82 is repeated for each additional motor included in power seating system 10 until the input signal (i.e., command signals $S_{CMD}$ from receiver 34) is being tested in step 84 to determine whether it contains (i.e., is encoded with information) commands associated with motor N.

If the answer to the inquiry in step 84 is "NO", then control of the routine is passed to step 86, where decoder 36 generates an appropriate control signal to turn (or maintain) motor N off.

However, when the input command, as determined by step 84, contains a command to turn motor N on, ("YES"), then control of the routine is passed to step 88.

In step 88, control means 35 via decoder 36 determines whether the direction information in the input command is for a forward direction. If the answer to this inquiry is "YES", then control is passed to step 90, wherein control means 35 by way of decoder 36 generates an appropriate control signal to place motor N in a forward operating state.

Otherwise, control is passed from step 88 to step 92, where control means 35 via decoder 36 generates an appropriate control signal to place motor N in a reverse operating state.

In either case, step 94 is then executed, wherein decoder 36 outputs an appropriate control signal to turn motor N on.

In step 96, control means 35 determines whether the input command received contains a command to turn heater 46 on. If the answer to this inquiry is "NO", then decoder 36 outputs an appropriate control signal, in step 98, to turn (or maintain) heater 46 off.

Otherwise, control is passed from step 96 to step 100, where control means 35 via decoder 36 further determines whether the heat setting information contained in the input command corresponds to a high level. If the answer to this inquiry is "YES", control is passed to step 102. In step 102, decoder 36 outputs an appropriate control signal to place heater 46 in a high heater setting. Otherwise, control is passed from step 100 to step 104. In step 104, decoder 36 outputs an appropriate control signal to set the heater 46 to a low heater setting. In either case, control is then returned to step 64.

In the alternative, the commanded heat setting may comprise a 4-bit or 8-bit digital word corresponding to 16 or 256, respectively, discrete heat levels. A temperature sensor (e.g., a negative temperature coefficient (NTC) thermistor) may be provided in the seat 14 to measure its temperature. The digital word may then be provided to a seat heater control circuit (not shown), which uses the sensor output in a closed loop fashion to regulate the temperature of the seat, as heated.

Figure 2:
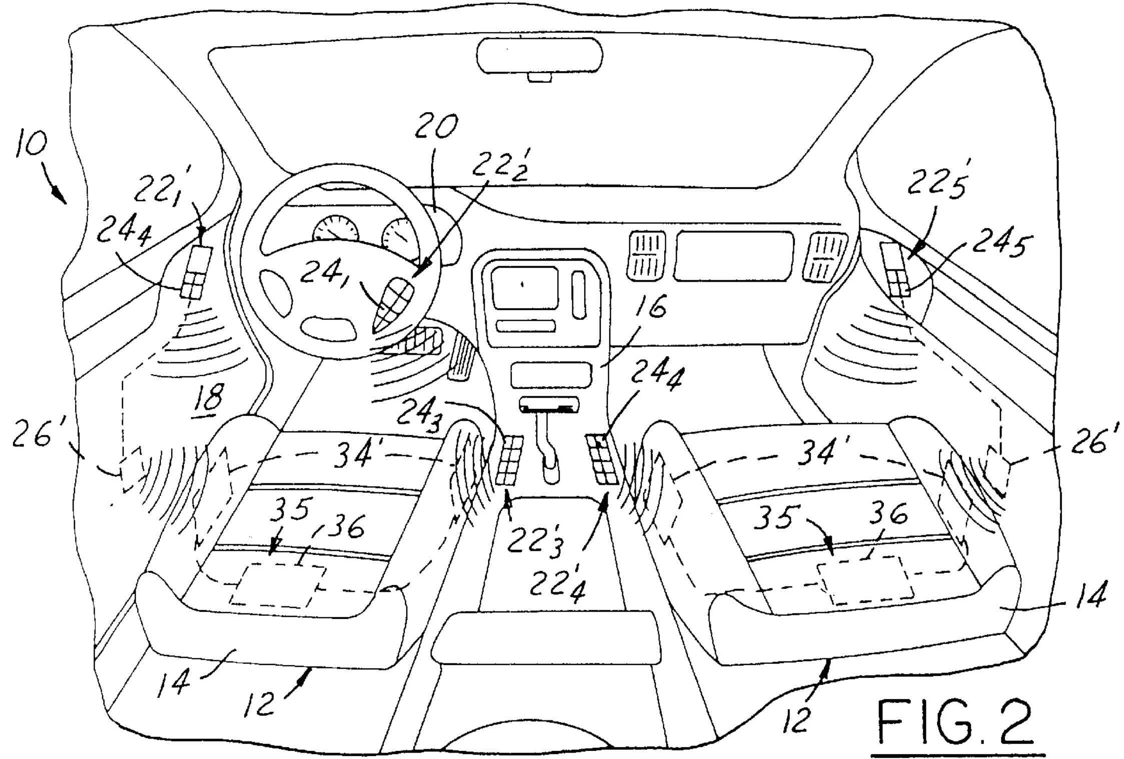
FIG. 2 is a fragmentary schematic view of a vehicle including an alternative power seating system embodiment according to the present invention, particularly including light-emitting communicating means.

FIG. 2 shows an alternate embodiment, namely, power seating system 10'. Power seating system 10' is substantially identical to power seating system 10, with the exception that the means for communicating the command signals from selector 24 to control means 35 comprises light emitting transmission and detection circuitry.

In particular, and with reference to FIG. 2, power seating system 10' includes a plurality of selector assemblies $22'_1$, $22'_2$, . . . , $22'_5$. The RF transmission portion of selector assembly 22 of the first embodiment has been replaced by light emitting means 26' in the second embodiment. Light emitting means 26' is provided for generating light signals corresponding to the command signals. In addition, antenna 32 and receiver 34 of the first embodiment have been replaced in the second embodiment by light reception means 34' responsive to the generated light signals for reproducing the command signals. Light reception means may comprise a multi-channel light receiver. In this alternate embodiment, light reception means 34' is preferably disposed in a line-of-sight (LOS) relation with respect to light emitting means 26'. Therefore, in most configurations, light emitting means 26' will not be integral with selector 24, but rather will be disposed a distance away, connected electrically by wiring. Preferably, the wave lengths of light used are invisible to the naked human eye, and may preferably comprise infrared (IR) spectrum light signals. Light emitting means 26' and light reception means 34' may include conventional diode transmitters, and receivers, respectively.

Thus, in the alternate embodiment, the means for communicating the command signals by way of electromagnetic radiation from selector $\mathbf{24}_i$ to control means 35 comprises light emitting means 26' and light reception means 34'.

The present invention provides a power seating system which includes remote, wireless control of the seating position. The wireless feature eliminates the need for a wiring harness. The result is a power seating system that is improved in terms of cost, weight, bulk, and reliability.

While the best mode for carrying out the present invention has been described in detail, those familiar with the art to which this invention relates will recognize various alternative designs and embodiments for practicing the invention as defined by the claims appended hereto. In particular, other techniques for communicating command signals from the selector to the control means in a wireless fashion, such as (i) by induction, and (ii) through the use of magnetic flux and the like are contemplated herein and thus fall within the spirit and scope of the invention.

We claim:

1. A power seating system for a conventional land operated motor vehicle seat assembly, the system comprising:

selector means for generating one or more command signals configured to adjust a position of a conventional land operated motor vehicle seat throughout its range of motion;

said selector means comprising a plurality of user-actuated switches located within, and mounted on, the conventional land operated motor vehicle's door assembly away from said seat assembly;

a transmitter, co-located with said selector means, having an input for receiving said command signals from said selector means, and an output for transmitting electromagnetic radiation signals corresponding to said command signals;

a receiver disposed in said seat assembly for receiving said electromagnetic radiation signals and reproducing said command signals;

a controller disposed in said seat assembly comprised of a multi-channel processor, configured to generate one or more control signals in accordance with said reproduced command signals;

a seat function circuit including a seat position adjusting circuit, said adjusting circuit being configured to adjust the position of said seat in accordance with said control signals by use of a plurality of electric motors, each motor having respective forward and reverse directions;

said adjustment of said seat including at least adjustment of the seat forward and backward, and up and down, in relation to the occupant compartment of the conventional land operated motor vehicle, adjustment of the lumbar portion of said seat and activation of a seat heater of said seat.

2. The system of claim 1 wherein said transmitter generates radio-frequency (RF) signals corresponding to said command signals, and said transmitter is responsive to said generated RF signals for reproducing said command signals.

3. The system of claim 1 wherein said transmitter generates light signals corresponding to said command signals, and said receiver is responsive to said generated light signals for reproducing said command signals.

4. The system of claim 3 wherein said receiver is disposed in a line-of-sight (LOS) of said transmitter.

* * * * *